Feb. 28, 1956 M. CAMRAS 2,736,775

MAGNETIC TRANSDUCER HEAD ASSEMBLY

Filed Oct. 3, 1950 3 Sheets-Sheet 1

Inventor
Marvin Camras
by Hill, Sherman, Meroni, Gross & Simpson
Attys

Feb. 28, 1956 M. CAMRAS 2,736,775

MAGNETIC TRANSDUCER HEAD ASSEMBLY

Filed Oct. 3, 1950 3 Sheets-Sheet 2

Inventor
Marvin Camras by Hill, Sherman, Meroni, Gross & Simpson
Attys

Inventor
Marvin Camras
by
Attys

United States Patent Office 2,736,775

Patented Feb. 28, 1956

2,736,775

MAGNETIC TRANSDUCER HEAD ASSEMBLY

Marvin Camras, Chicago, Ill., assignor to Armour Research Foundation of Illinois Institute of Technology, Chicago, Ill., a corporation of Illinois Application October 3, 1950, Serial No. 188,208

4 Claims. (Cl. 179—100.2)

This invention relates to a magnetic transducer head assembly, and more particularly, to the relationship of a tape magnetic record member to one or more electromagnetic transducer heads.

One common form of magnetic recording and reproducing device is a machine employing a tape of magnetizable material or a tape of non-magnetic material having a magnetizable coating or impregnation thereon. Many of these machines employing a tape record member are so arranged that the magnetic record member lies along the tape or is recorded along the tape in a plurality of channels.

One of the principal features and objects of the present invention is to provide a novel arrangement of electromagnetic transducer heads with a multichannel magnetic tape record member.

Another object of the present invention is to provide a magnetic transducer head assembly for a dual track magnetic record member in which the magnetic transducer pole means engage less than half of the width of the tape.

A still further object of the present invention is to provide a novel magnetic transducer head assembly employing a plurality of electromagnetic transducer heads over which a tape record member successively passes and each transducer head pole means bearing a novel predetermined relationship to the width of the tape.

Another and still further object of the present invention is to provide a novel magnetic transducer head assembly for multi-channel magnetic tape record members in which cross-talk is substantially reduced or eliminated, and which is efficient and reliable in operation.

Still another object of this invention is to provide a novel dual channel record member with recordings thereon.

This application is a continuation-in-part of my copending application, Serial No. 771,494, for "Magnetic Sound Apparatus," filed August 30, 1947, and now Patent Number 2,654,809, issued October 6, 1953, and Serial No. 690,877, for "Magnetic Tranducer Head," filed August 16, 1946, issued April 24, 1951, as U. S. Patent No. 2,549,771.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawings, in which:

Figure 7:
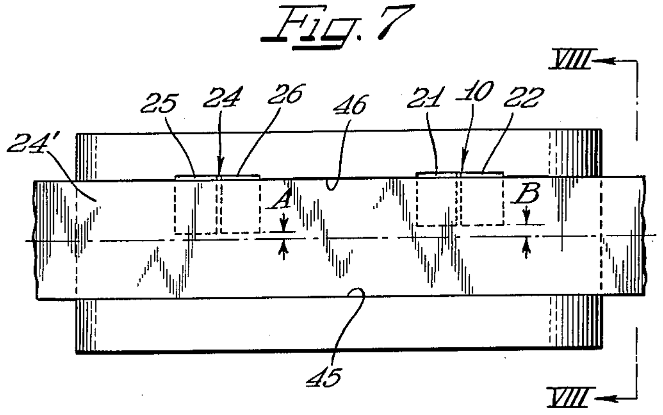
Figure 8:
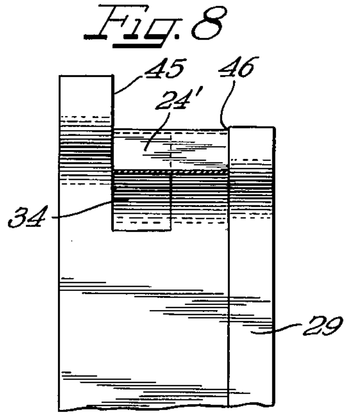
Figure 9:
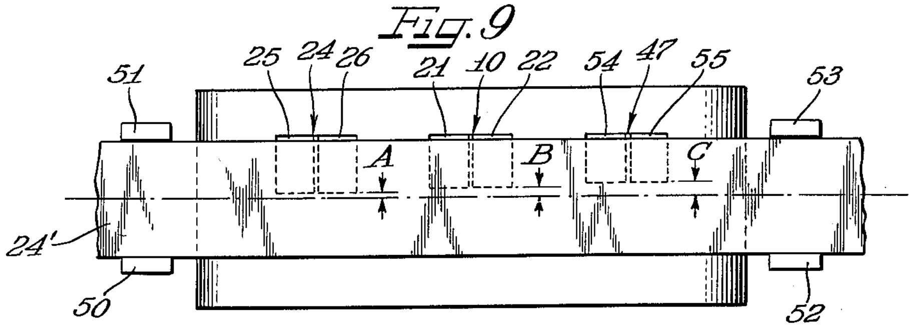
Figure 10:
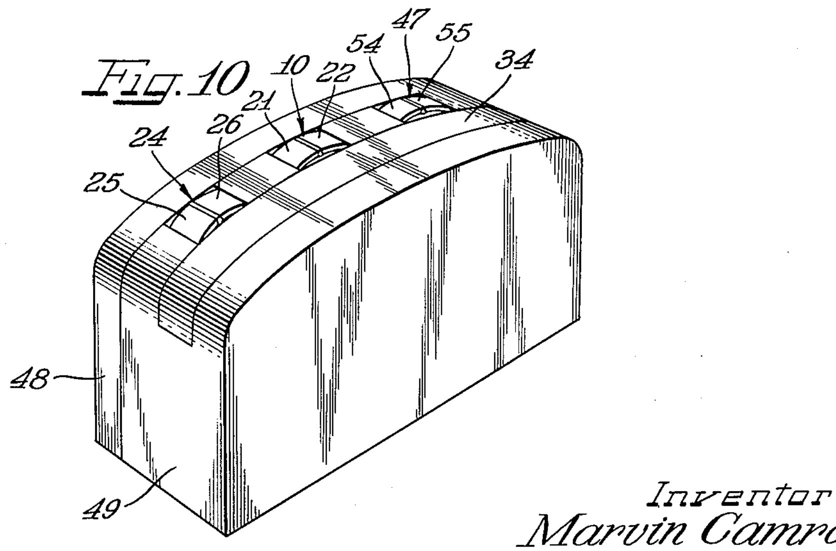

Figure 7 is a plan view of an electromagnetic transducer head assembly illustrating a fourth embodiment of the present invention showing the erase head pole portions and the record-playback pole portions extending beyond one edge of the tape record member, but in which the other edge of the erase head does not quite extend to the center line of the tape record member, and in which the record-playback pole portions do not extend as far over toward the center of the record member as do the erase head pole portions;

Figure 8 is an end view of the electromagnetic transducer head assembly shown in Figure 7 of the drawings as taken along the line VIII—VIII thereof;

Figure 9 is a plan view of an electromagnetic transducer head assembly illustrating a fifth embodiment of the present invention and employing at least three electromagnetic transducer heads, each of which extends less and less near the center line of the tape record member, and in which guides are employed for positioning the tape as it passes over the head assembly, which guides are not a direct part of the transducer head assembly but are in operative association therewith; and Figure 10 is an isometric view of the electromagnetic transducer head assembly shown in Figure 9.

The term "electromagnetic transducer head" as used throughout is a generic expression referring to such devices as an electromagnetic record-playback head for magnetic recording and reproducing apparatus, to an erase head for demagnetizing or magnetically saturating a magnetic record member so as to condition it for a magnetic recording operation, and to a monitoring head for immediately listening to a recording as it is being made. The term "record-playback head" is used whether the head is employed for magnetically recording only, for magnetically reproducing only, or for selectively doing either.

Figures 1, 2:
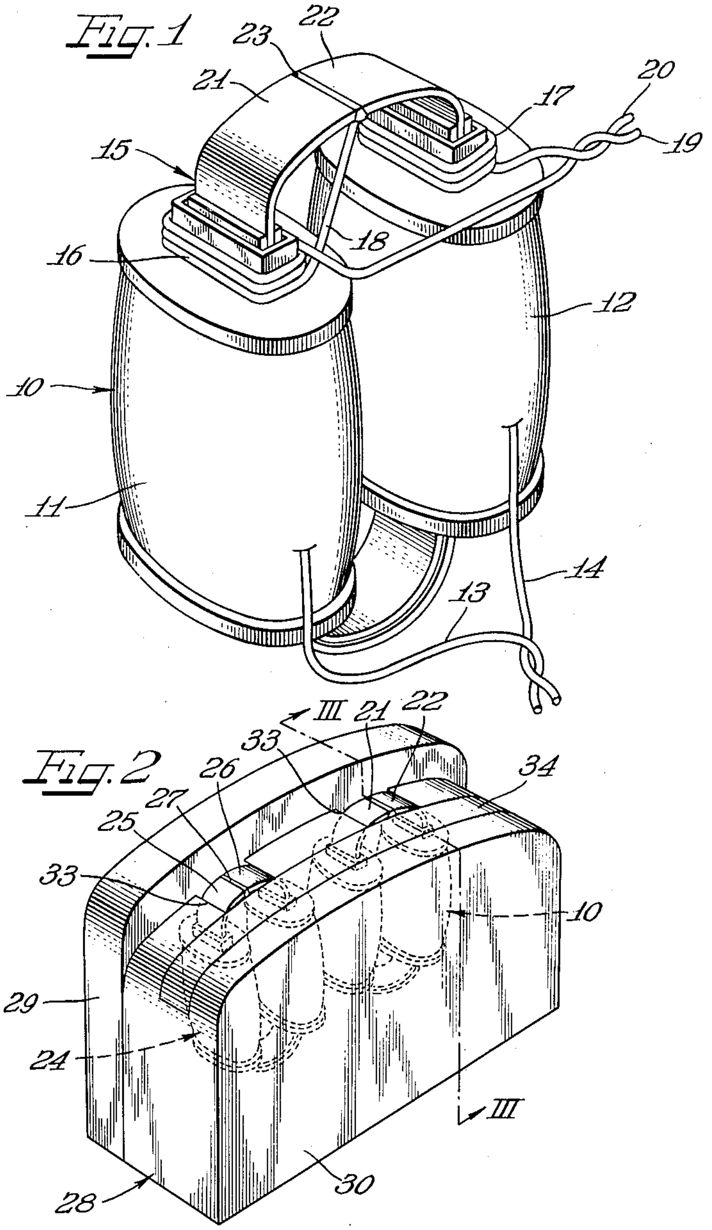
Figure 1 is a isometric view of the core, pole and coil construction of a magnetic transducer head.
Figure 2 is an isometric view showing a pair of electromagnetic transducer heads similar to the one illustrated in Figure 1 mounted in a complete and unitary assembly for a magnetic recording and reproducing device.

In Figure 1 of the drawings, an electromagnetic transducer head 10 is illustrated in the form of a record-playback head and includes a pair of signal coils 11 and 12 which are preferably connected in series. The external leads from these two coils 11 and 12 are indicated at 13 and 14. In addition to the coils 11 and 12, a few turns of wire are taken around the core structure 15 above each coil 11 and 12 as at 16 and 17. These few turns of wire which provide the coils 16 and 17 provide the high frequency bias windings for the record-playback head and are wound in a reverse sense with respect to each other and series connected by a cross lead 18. The input leads of the coils 16 and 17 are indicated at 19 and 20.

The particular construction of the core including the pole portions thereof forms no part of the present invention and are, therefore, not illustrated in detail, but it is to be understood that the core structure includes a pair of pole portions 21 and 22 having a non-magnetic gap 23 lying therebetween. The non-magnetic gap 23 is preferably in the form of a piece of non-magnetic material which provides a suitable spacing between the pole portions 21 and 22. The pole portions 21 and 22, together with their non-magnetic spacer 23 provide a slightly arcuate surface over which and in contact with a tape record member 24' (see Figure 3) passes.

The magnetic tape record member 24' may be in the form of a metallic ribbon of magnetizable material or may be formed of a non-magnetizable material such as paper, plastic or the like having a magnetizable coating of material thereon or an impregnation of magnetizable material therein. While the magnetic tape record member 24' may have a number of different parallel recording and reproducing channels thereon, in the first, third, fourth and fifth forms of the invention illustrated, the record member is of the dual channel type.

As the relation of the width of the magnetic record member with respect to the width of the various electromagnetic transducer heads associated with the record member is of great importance and is one of the principal features of the present invention, this dimension has been designated by the letter "W."

The first embodiment of the present invention is a magnetic transducer head assembly composed of a record-playback head 10 of the type illustrated in Figure 1 and a second head which is an erase head and of the same type as that shown in Figure 1 without the high frequency bias winding thereon. This second or erase head is generally designated by the numeral 24 and lies in a direct line with the record-playback head 10 in the path of travel of the tape record member 24' so that the tape passes first over the erase head 24 and then over the record-playback head 10.

The erase head 24 includes a pair of pole portions 25 and 26 with a non-magnetic gap 27 therebetween. This non-magnetic gap may be in the form of non-magnetic material such as solder or may be an open air space. This non-magnetic gap 27 in the erase head 24 is preferably slightly larger than the gap in the record-playback head 10 in order that the portion of the record member passing thereover will be demagnetized before reaching the record-playback head during the recording operation. As is well known to those skilled in the art, the erase head is not energized during the time that the record-playback head is being used for playback purposes.

Figure 3:
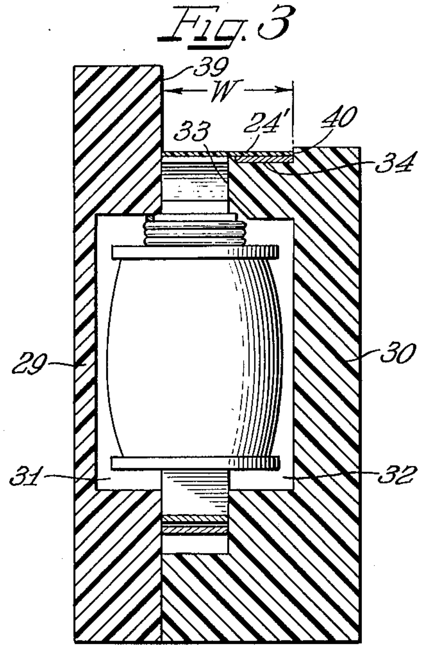
Figure 3 is a vertical sectional view taken along the line III—III of Figure 2.

As may be seen best in Figures 2 and 3 of the drawings, the magnetic transducer head assembly includes a two-piece housing of non-magnetic material indicated generally at 28 and composed of a rear housing member 29 and a front housing member 30. These housing members 29 and 30 are provided with confronting recessed portions 31 and 32, respectively, into which the heads 10 and 24 are mounted. The upper wall of the housing member 30 is provided with openings 33 through which the pole portions 21 and 22 of the record-playback head 10 and the pole portions 25 and 26 of the erase head 24 project.

Also mounted in the upper surface of the housing member 30 is a magnetic keeper 34 which is formed of soft iron or other suitable magnetic material having relatively high permeability and low magnetic retentivity. This keeper 34 is in the form of a strip embedded in the upper surface of the housing member 30 and extends over the entire upper surface thereof along the path of travel of the record member, but extending approximately across one-half of the width only of the tape 24'. Thus, as the tape record member 24' passes across the magnetic transducer head assembly approximately half of the width thereof rides directly in contact with this magnetic keeper while less than the remaining half of the width of the tape rides in contact with the pole portions 25 and 26 of the erase head 24 and the pole portions 21 and 22 of the record-playback head 10. This magnetic keeper 34 prevents the magnetic field set up by the pole portions lying adjacent thereto from influencing the channel on the tape record member 24' which is passing over the keeper. On playback, it prevents stray pickup from the adjacent channel on the tape record member 24'.

While the electrical energization circuits of the erase head 24 and of the record-playback head 10 are not illustrated, it will, of course, be understood that both are connected to suitable electric circuits in a magnetic recording apparatus.

While it has been known in the past to employ a dual track magnetic tape record member and cause the same to pass over a pair of pole portions, all such known arrangements have suggested the concept of having the pole portions equal in width to exactly half of the width of the tape. This is exemplified, by way of example, in the German Patent No. 617,796, to Allgemeine Elektricitats-Gesellschaft, dated August 28, 1935. Arrangements such as that shown in the German patent have not been found to be particularly efficient in operation due to the high degree of cross-talk and other interference between adjacent channels. I have discovered that if the width of the pole portions of the magnetic transducer head are made less than one-half of the width of the tape in a dual track magnetic record member and less than the proportional width of the channel in a multi-channel tape member, a very marked increase in efficiency and fidelity is obtained.

Figure 4:
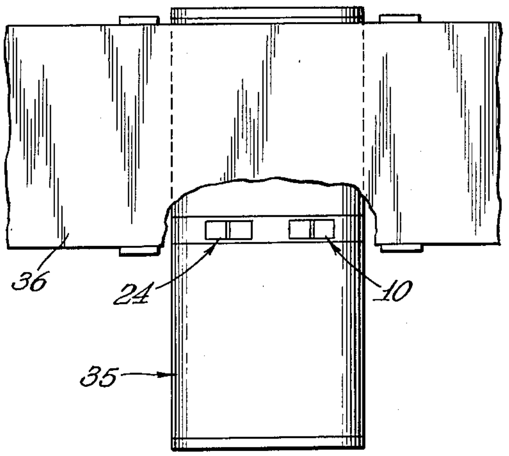
Figure 4 is a plan view of a modified form of the present invention wherein an extremely wide tape is used having a large number of parallel recording channels and the tape being in a position to record or reproduce from a channel adjacent one edge of the tape.
Figure 5:
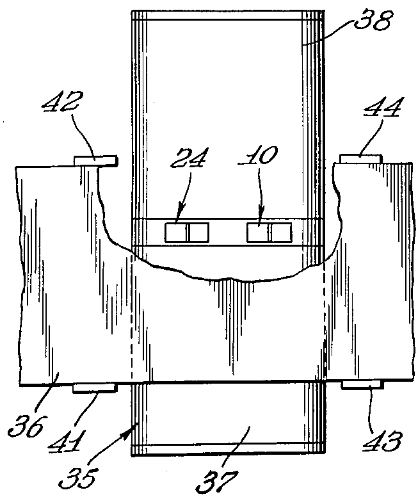
Figure 5 is a view similar to Figure 4 but with the head moved so that one of the intermediate channels along the tape is in active cooperation with the electromagnetic transducer heads.

A multi-channel version of the present invention is illustrated in Figures 4 and 5 of the drawings. Here, a housing 35 is provided which is much wider than that illustrated in Figures 2 and 3 of the drawings. This is to accommodate a magnetic tape record member 36 which is sufficiently wide to enable a large number of parallel channels to be recorded thereon and reproduced therefrom. This will readily be appreciated from a comparison of the width of the erase head 24 and the record-playback head 10 in comparison with the width of the tape 36. The housing 35 containing the erase head 24 and the record-playback head 10 is arranged to be moved relative to the width of the tape 36 so that successive parallel channels may be recorded on or reproduced from the tape 36. This will be clearly understood from a comparison of the tape 36 with respect to the housing 35 after it has been moved over several channels (see the difference between Figures 4 and 5 in this connection).

In this construction shown in Figures 4 and 5 of the drawings, two relatively wide magnetic keepers 37 and 38 are provided on either side of the heads 24 and 10. Thus, all of the channels not being used are prevented from being influenced by the fields set up in the region of the channel which is being used and prevents stray pickup on playback.

In the form of the invention illustrated in Figures 4 and 5 of the drawings, the width of the pole pieces on the magnetic transducer heads 24 and 10 are slightly less than the width of the channel associated therewith on the magnetic tape record member 36. The word "channel" as used herein is not employed to designate a region which is necessarily physically different from or physically marked out on the tape record member, for the tape record member may be a paper or plastic tape having a uniform coating of magnetizable material spread completely over one surface thereof. The term "channel" is rather used to designate the relative portion of the width which is available for each continuous recording or reproducing operation. Thus, for example, if eight parallel recordings appears on or are to appear on the tape record member 36, each channel may be said to be one-eighth of the width of the tape, and in such case, the width of the pole pieces of the magnetic transducer heads 24 and 10 must be slightly less than one-eighth of the width of the tape.

It will be noted that in the first form of the invention the magnetic tape record member 24' is guided by virtue of the shallow groove or channel made between the upright rear wall 39 of the housing member 29 and the slightly raised shoulder portion 40 of the front housing member 30. In the second embodiment of the present invention, the tape is guided by guide elements 41, 42, 43 and 44 which lie near the magnetic transducer head assembly but which are not a direct part thereof.

Figure 6:
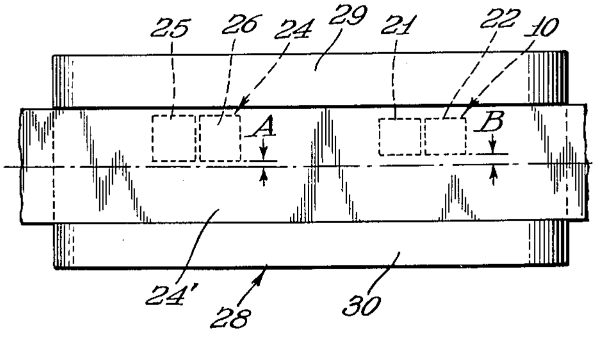
Figure 6 is a plan view of an electromagnetic transducer head assembly employing a pair of electromagnetic transducer heads in line and similar to the arrangement of Figure 2 with the erase head pole pieces slightly less than half the width of the tape and with the record-playback head pole pieces slightly less than the width of the erase head pole pieces.

A third embodiment of the present invention is illustrated in Figure 6 of the drawings. This form of the invention is similar to that shown in Figures 1, 2 and 3 of the drawings and similar reference characters have been employed to refer to similar parts. The difference between this form of the present invention and the first form of the invention lies in the fact that the shoulder 40 has been eliminated which is an advantage, for then tapes of wider than normal width may be used, for the heads are then still less than one-half the width of the tape. In this form, the shoulder 39 acts as the sole guide member and determines the position of the tape with respect to the heads. A further difference lies in the fact that the width of the pole portions 21 and 22 of the record-playback head are less than the width of the pole portions 25 and 26 of the erase head. Both, however, are less than one-half of the width of the tape. It is important to note that the important dimension in a two-channel tape recorder is the spacing of the pole portions of the magnetic transducer head from the center line of the tape. As illustrated in Figure 6, the spacing between the nearest side edge of the pole portions 25 and 26 of the erase head and the center line of the tape is designated by the letter "A," while the spacing between the nearest edge of the pole portions 21 and 22 of the record-playback head 10 and the center line of the tape is represented by the letter "B." Thus, in this form of the invention, $B>A>0$.

With the erase head slightly narrower than the width of a channel on the tape 24', no interference in the adjacent channel results from the operation of the erase head. With the record-playback head 10 slightly narrower than the width of the erase head, proper erasure is assured across the entire width of the record-playback head.

In Figures 7 and 8 of the drawings, a fourth embodiment of the present invention is illustrated for a dual track magnetic tape record member. Here, the front housing member 30 is provided with a high shoulder 45, while the rear housing member only has a slightly raised shoulder 46. This places the magnetic keeper 34 adjacent the high shoulder portion with the electromagnetic transducer heads 24 and 10 adjacent the low shoulder portion. In this particular form of the invention, the width of the pole portions 25 and 26 is substantially equal to the width of a channel on the dual track magnetic record member 24', or may even be greater than the width of such a channel, but the side edges of the pole portions 25, 26, 21 and 22 are spaced from the center line of the magnetic tape record member 24', and provided that the erase head covers at least as great a portion of the tape as the record-playback head.

Thus, these pole portions 25, 26, 21 and 22 extend over less than one-half of the width of the tape, or, in other words, less than the width of the channel. Furthermore, this spacing of the edges of the pole portions 25, 26, 21 and 22 from the center line of the tape is indicated by the letters "A" and "B." Thus, the spacing of the erase head from the center line of the tape is less than the spacing "B" of the record-playback head. More particularly, here again, the spacing is represented by the expression, $B>A>0$.

Figures 9 and 10 of the drawings illustrate a fifth embodiment of the present invention wherein the magnetic transducer head assembly is made up of three magnetic transducer heads. These magnetic transducer heads include an erase head 24, a record-playback head 10 and a monitoring head 47. The monitoring head 47 is similar to the record-playback head illustrated in Figure 1 of the drawings, with the exception that it has no high frequency winding thereon, for it is used only for playback purposes. These heads are mounted in a pair of housing members 48 and 49 which are similar to housing members 29 and 30, except that they have no shoulders on the upper surfaces thereof. The tape is guided in the proper position across the magnetic transducer head assembly by means of guide elements 50, 51, 52 and 53. A magnetic keeper 34 is employed in the same manner and for the same purposes as hereinbefore described in connection with the other embodiments of the invention.

The side edges of the pole portions 25 and 26 of the erase head 24 lying nearest the center line of the magnetic tape record member 24' are spaced therefrom as indicated at "A" in Figure 9 of the drawings. The side edges of the pole portions 21 and 22 of the record-playback head lying nearest the center line of the tape 24' are spaced from the center line a distance equal to "B," and this distance is slightly greater than the distance "A."

The pole portions 54 and 55 of the monitoring head 47 lying nearest the center line of the tape 24' are spaced therefrom by a distance "C" which is greater than the spacing "B" of the record-playback head. The actual width of the respective pole portions is immaterial provided this relationship of spacing of the respective heads is maintained, and provided that the respective heads at least cover a substantial portion of the channel with which they are operatively associated. Thus, in this form of the invention, the critical spacing may be expressed as $C>B>A>0$.

In the present invention, as represented by the various embodiments hereinbefore described, it will be observed that the mounting of the several heads in a unitary assembly maintains all heads in proper relation to each other and to the tape channel being used. It has been found that small variations in their respective relative positioning can be very critical and would destroy the fidelity and efficiency of the recording or reproducing apparatus.

It has been pointed out that the form illustrated in Figure 6 enables wider than normal tapes to be used. It should be noted that with the form shown in Figure 8, narrower tapes than normal may be used provided that shoulder 45 be employed as the guide surface of the tape. Here, the presence of the other shoulder 46 would prevent tapes which are wider than normal from being used (which is a distinct advantage since the use of such tapes in the head of Figure 8 might result in objectionable interference).

By the use of the staggered head arrangement in the third, fourth and fifth embodiments of the present invention (as illustrated in Figures 6, 7 and 9), slight misalignment of tape with respect to the heads or slight variations in head widths or head positionings is no longer critical. This is highly important in commercial practice since reasonable manufacturing tolerances are thereby permitted.

By the use of heads which extend beyond the side edge of the tape but do not extend quite to the center line of the tape, the maximum usable area of the tape is taken advantage of without the attendant disadvantage of cross-talk or interference. With such an arrangement, it will also be observed that a novel magnetic record may be obtained wherein the tape is magnetized along two channels which extend to the extreme outer edges of the tape, and each of which has a width slightly less than half of the width of the tape.

While I have shown certain particular embodiments of my invention, it will, of course, be understood that I do not wish to be limited thereto since many modifications may be made, and I, therefore, contemplate by the appended claims to cover all such modifications as fall within the true spirit and scope of my invention.

I claim as my invention:

1. A multi-channel magnetic recording and reproducing system, comprising, a multi-channel record member having laterally adjacent channels, an erase head in operative relation to said record member over an operative width no wider than the width of said erase head of each said channel to erase magnetic traces from said channel, and a recording head in operative relation to said record member over an operative width of said recording head less than said operative width of said erase head, and spaced from said erase head in the direction of movement of said record member to subsequently produce a recorded trace in said channel that will always be in a completely erased portion of said channel, thereby minimizing interference with the newly recorded trace.

2. A multi-channel magnetic recording and reproducing system as defined in claim 1 and a monitoring head in operative relation to said record member over an operative width of said monitoring head less than said operative width of said recording head and spaced from said recording head in the direction of movement of said record member to monitor the newly recorded trace.

3. A multi-channel magnetic recording and reproducing system as defined in claim 1, said erase head including spaced poles having an erase gap therebetween with the width of the gap extending transversely of the direction of movement of the record member, the width of said gap being in operative relation to said record member over a distance measured at right angles to the direction of movement of the record member not greater than the width of each said channel.

4. A multi-channel magnetic recording and reproducing system as defined in claim 3, said recording head including spaced poles having a recording gap therebetween with the width of the gap extending transversely of the direction of movement of the record member, the width of said recording gap being in operative relation to said record member over a width of said record member measured at right angles to the direction of movement of said record member of less than said width of the record member over which the erase gap is in operative relation to said record member.

References Cited in the file of this patent

UNITED STATES PATENTS

| | | |
|---|---|---|
| 1,366,617 | Wier et al. | Jan. 25, 1921 |
| 2,213,246 | Heller | Sept. 3, 1940 |
| 2,335,277 | Heller | Nov. 30, 1943 |
| 2,419,195 | Begun | Apr. 22, 1947 |
| 2,535,480 | Begun | Dec. 26, 1950 |
| 2,538,892 | Begun | Jan. 23, 1951 |

FOREIGN PATENTS

| | | |
|---|---|---|
| 512,766 | Great Britain | Nov. 30, 1937 |
| 884,881 | France | Aug. 7, 1942 |